United States Patent [19]
Kuo et al.

[11] Patent Number: 6,011,565
[45] Date of Patent: Jan. 4, 2000

[54] NON-STALLED REQUESTING TEXTURE CACHE

[75] Inventors: Dong-Ying Kuo, Pleasanton; Zhou Hong, San Jose; Randy Zhao, Fremont; Roger Niu, San Jose; Poornachandra Rao, Santa Clara; Lin Chen, Sunnyvale; Jeremy Alves, Mountain View, all of Calif.

[73] Assignee: S3 Incorporated, Santa Clara, Calif.

[21] Appl. No.: 09/057,628

[22] Filed: Apr. 9, 1998

[51] Int. Cl.[7] ........................................................ G09G 5/00
[52] U.S. Cl. ............................. 345/513; 345/515; 345/430
[58] Field of Search .................................... 345/501, 502, 345/507–509, 511, 513, 521, 430, 515

[56] References Cited

U.S. PATENT DOCUMENTS

| 5,751,292 | 5/1998 | Emmot | 345/430 |
| 5,828,382 | 10/1998 | Wilde | 345/509 |
| 5,831,640 | 11/1998 | Wang et al. | 345/521 |
| 5,886,706 | 3/1999 | Alcorn et al. | 345/507 |

OTHER PUBLICATIONS

J. Montrym, D. Baum, D. Dignam, C. Migdal, "InfiniteReality: A Real–Time Graphics System", SIGGRAPH 97, Computer Graphics Proceedings, Annual Conference Series, Aug. 3–8, 1997, pp. 293–301.

S. Winner, M. Kelley, B. Pease, B. Rivard, A. Yen, "Hardware Accelerated Rendering Of Antialiasing Using A Modified A–buffer Algorithm", SIGGRAPH 97, Computer Graphics Proceedings, Annual Conference Series, Aug. 3–8, 1997, pp. 307–316.

*Primary Examiner*—Kee M. Tung
*Attorney, Agent, or Firm*—Fenwick & West LLP

[57] ABSTRACT

A caching system for increasing the operation concurrency between a cache module and a memory module by comparing received memory block identifiers, which correspond to texels needed for pixel composition, with memory block identifiers corresponding to texels locally stored within the cache module. If the received memory block identifiers match the memory block identifiers corresponding to locally cached texels, the system transmits these texels to a texture filter unit for pixel composition. If the received memory block identifiers do not match memory block identifiers corresponding to the locally cached texels, the system retrieves these texels from the memory module as fast as possible and then updates the cache module with the new texels. A plurality of first in, first out buffers are used to assist a controller module with synchronizing the transmission of the texels from the cache module and the overwriting of the texels received from the memory module into the cache module. Once locally cached, these texels also are transmitted to the texture filter unit for pixel composition.

20 Claims, 5 Drawing Sheets

NON-STALLED REQUESTING TEXTURE CACHE

BACKGROUND OF THE INVENTION

1. Field of the Invention

This invention generally relates to the field of computer graphics systems and more particularly to the generation and processing of textures in computerized graphical images.

2. Description of Related Art

To achieve realism in a three-dimensional pixel-based computer-generated graphic image, realistic surface shading must be added to the graphic image in order to simulate real-world surface features such as surface texture. A conventional manner for generating such surface characteristics is texture mapping.

Texture mapping is a relatively efficient technique for creating the appearance of a complex image without the tedium and excessive computational costs of having to directly render three-dimensional details on the surface of a three-dimensional graphic image. In particular, a source (texture) image, which is comprised of individual elements (texels), is mapped through pixel composition onto the three-dimensional graphic image. For example, to generate a graphic image of an oak table, first the structure of the chair is created. Second, a texture image of oak wood is mapped over the structural surface of the chair. To correctly integrate this oak texture image onto the chair, a predefined number of texels are interpolated to generate each pixel of the surface of the chair.

As is well known in the art, two of the more common texture mapping techniques to effectively interpolate pixels from a texture image are bi-linear filtering and tri-linear filtering. In bi-linear filtering, four texels are used to interpolate each pixel of the graphic image. In tri-linear filtering, eight texels are used to interpolate each pixel of the graphic image.

To avoid potentially overwhelming bandwidth requirements, which are attributable to the use of these texture mapping techniques, mip (multum in parvo) mapping often is used to compress the texture image into texture maps of different 'd' levels of resolution. During the scan conversion phase of rasterization, each of these mip maps of the texture map is precomputed with a specific 'd' level of detail and is separately stored. Depending upon the level of detail of the pixel-based graphic image, a specific 'd' level of the texture map is retrieved for texture filtering. For example, if the graphic image is displayed as a smaller image in the background of a computer-generated graphical scene, the level of detail is low, thereby allowing a lower resolution (e.g., d=4) texture map to be used. With less texels needed for the texture filtering, the lower resolution texture map results in lower system bandwidth requirements. Alternatively, if the graphic image is displayed as a full-size image in the foreground of a graphic scene, a higher resolution texture map surface (e.g., d=0) is used, thereby raising the overall system bandwidth requirements.

Unfortunately, as discussed in "Hardware Accelerated Rendering of Anti-aliasing Using a Modified A-Buffer Algorithm," Computer Graphics, 307–316, (Siggraph '97 Proceedings), which is incorporated by reference herein, in a real-time environment, where several tens of millions of pixels must be generated every second by these complex texture mapping techniques, high computational demands and tremendous bandwidths for a texture mapping system are unavoidable. For example, with a primary goal of the texture mapping system achieving an average pixel composition rate of one pixel per clock cycle, without the use of caching, one memory block (e.g. four 32-bit texels in a 2×2 matrix configuration) must be retrieved every clock cycle. Based upon a clock frequency of approximately 100 MHz, the corresponding bandwidth requirements for achieving such an ideal data transfer rate is approximately 1600 Mbytes per second (MBps).

Due to the ever increasing user expectations of realism in computer generated graphics as well as the demand for economical texture mapping systems, achieving such ideal data transfer rates at an economical price is often elusive. For example, commercially available systems are available that integrate a texture mapping system together with a parallel DRAM memory module sub-system design. Even though such systems offer high data transfer rates, they are economically impractical to the average consumer due to the high price of such designs.

A more inexpensive implementation of the texture mapping system design is integration of the texture mapping system into a graphic accelerator card, which interfaces through an advanced graphics port/peripheral component interconnect (AGP/PCI) interface with a relatively inexpensive general purpose, personal computer. This implementation, however, is confronted with at least two significant performance limitations.

First, due to the AGP/PCI interface only having a bandwidth of approximately 512 MBps, the ability of the texture mapping system to achieve data rates of 1600 MBps is severely curtailed. In particular, such a bandwidth bottleneck results in a relatively significant latency between the system requesting a plurality of texels (memory block) from the memory module and the system receiving back the requested memory block. Second, by issuing these memory block requests in the order that the pixel identifiers are generated by the scan module, the texture mapping system often must page-switch DRAM pages within the memory module to obtain the necessary memory blocks, thereby injecting additional latency into the overall texture mapping system.

To address such performance issues, cost-sensitive texture mapping systems employ a cache module, which is internally located within the system to attempt to minimize the limitations of the AGP/PCI. By retrieving memory blocks prior to needing any of the texels contained within the memory block, the latency attributable to retrieving these texels through the AGP/PCI interface is reduced.

The performance advantages of this local cache design, however, are dependent upon the success ('hit') rate of storing the needed memory blocks within the cache module. For example, when rendering certain shapes (such as long, narrow triangles) as texture primitives, poor memory block locality issues can emerge. Due to cost constraints that require the cache module to be of a limited storage size, the memory block stored within the cache module, which is associated with the beginning of the scan conversion, is no longer locally stored within the cache module by the time the end of a scan conversion span is reached. This situation results in not only an increase in the failure (miss) rate to locate a specific memory block within the cache module, but also in an increase in the need to excessively swap memory blocks into and out of the cache module. To minimize this locality problem, texture mapping systems require accurate synchronization between the memory module and the cache module without dramatically increasing the cost of the system.

What is needed is a texture mapping system and method, which can effectively address the issues of transmitting as many texel requests as early as possible, synchronizing the processing of texel requests and the corresponding texels and avoiding bandwidth limitations in a cost-effective manner.

SUMMARY OF THE INVENTION

In accordance with the system and method of the present invention, an accelerated caching system is invented to increase the operation concurrency between a cache module and a memory module based upon efficient synchronization of a first in, first out scheme. The caching system may comprise a scan module, a memory module, a texture cache module, a texture filter module and a pixel processing unit.

The scan module generates pixel identifiers corresponding to both specific pixels in a three-dimensional graphic image and memory blocks of texels within the memory module. The texture cache module strips each of these pixel identifiers into its corresponding memory block (MB) identifier and texel identifier subcomponents. Based upon a first in, first out scheme, the texture cache module utilizes each MB identifier to determine whether a memory block corresponding to the MB identifier has already been locally stored within the cache module. If the memory block is already locally cached, the texture cache module synchronizes the transmission of the texels within the memory block to the texture filter module. If the memory block is not already locally cached within the texture cache module, the texture cache module retrieves the needed memory block from the memory module and stores the memory block in a specific location within the texture cache module. When these texels are needed for pixel composition, the texture cache module transmits the texels to the texture filter module.

This system and method ensures that a high performance and cost effective first in, first out caching scheme is achieved by increasing the operation concurrency between the cache module and the memory module through efficient synchronization.

DETAILED DESCRIPTION OF THE PREFERRED EMBODIMENTS

A preferred embodiment of the present invention is now described with reference to figures where like reference numbers indicate identical or functionally similar elements and the left most digit of each reference number corresponds to the figure in which the reference number is first used.

Figure 1:
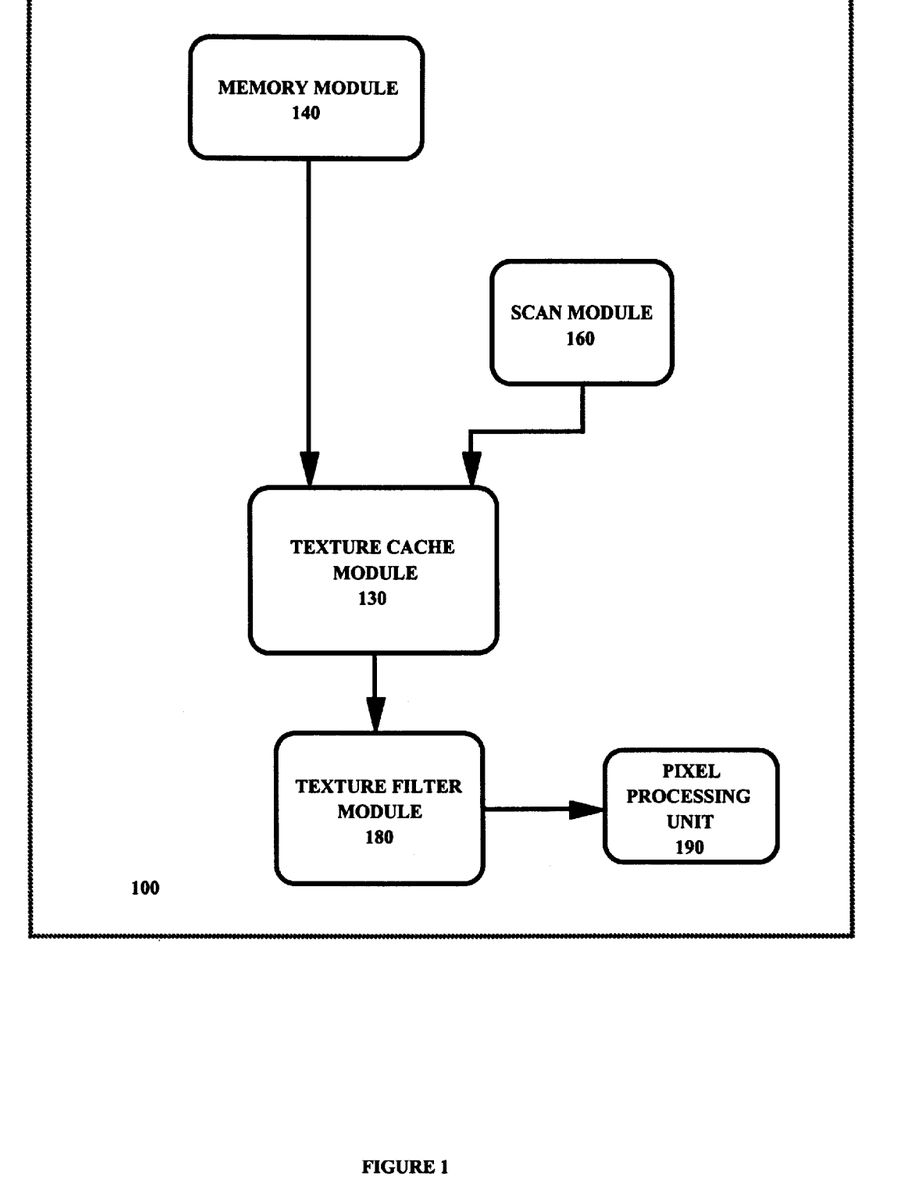
FIG. 1 is a high level illustration of a preferred embodiment of the texture mapping system of the preferred embodiment of the present invention.

FIG. 1 is an overview of the system of the preferred embodiment of the present invention for improving the performance of caching texels for pixel composition. The system 100 includes a memory module 140, a scan module 160, a texture cache module (TCM) 130, a texture filter module (TFM) 180 and a pixel processing unit (PPU) 190. In this embodiment, the memory module 140 is comprised of dynamic random access memory (DRAM), which stores each 4×4 matrix of texels in one of a plurality of memory blocks.

Figure 2:
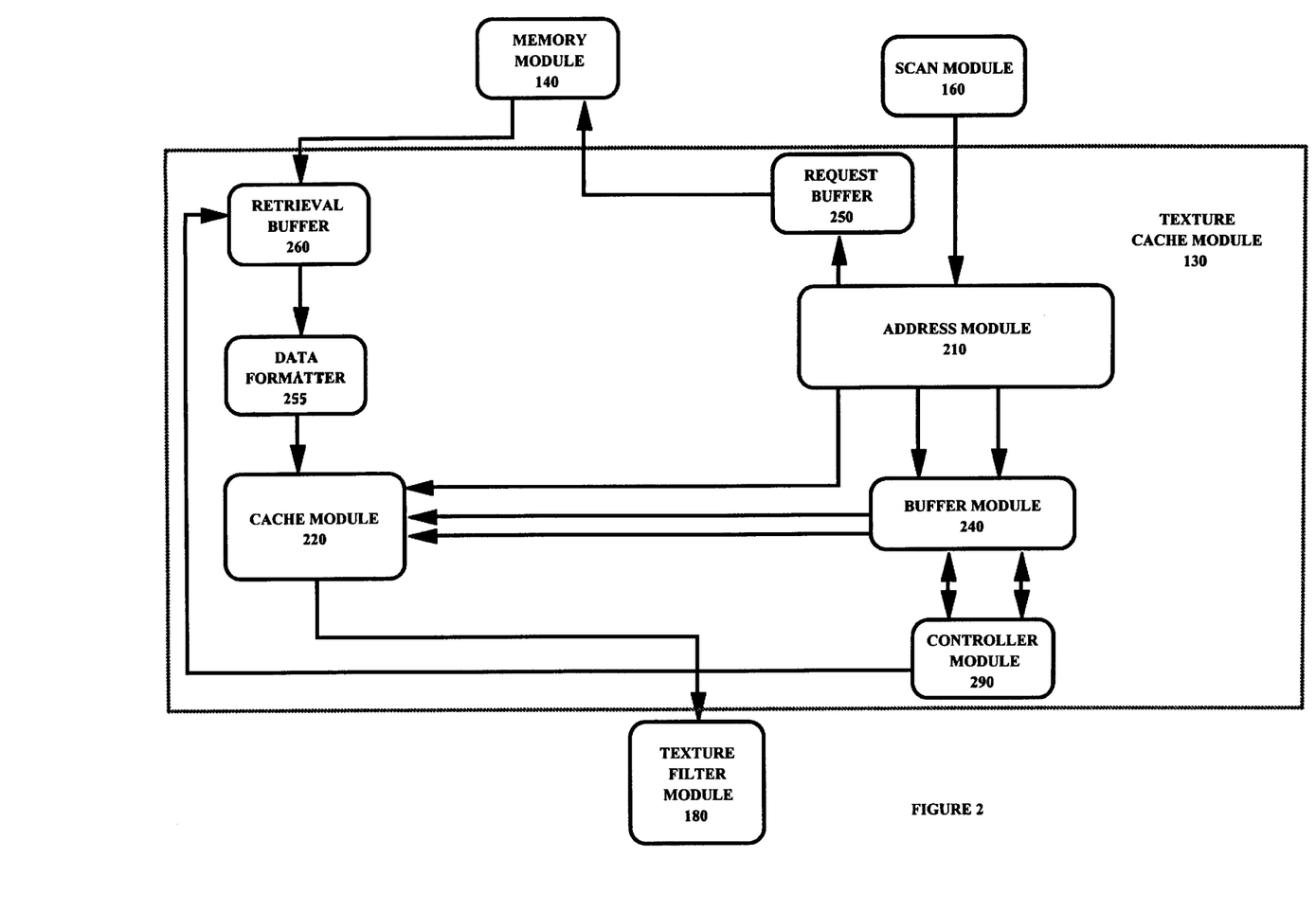
FIG. 2 is a detailed illustration of the texture cache module of the preferred embodiment.

The scan module 160 coupled to the TCM 130 transmits a plurality of pixel identifiers 510 (shown in FIG. 5) to the TCM 130. The TCM 130 utilizes each of these pixel identifiers 510 to ensure that a memory block corresponding to the pixel identifier 510 has been retrieved from the memory module 140 and locally cached within the TCM 130. Once the memory blocks are locally cached, each texel within the memory block corresponding to the pixel identifier 510 is transmitted to the TFM 180. The TFM 180 filters the received texels into resultant texels, which then are transmitted to the PPU 190 for pixel composition FIG. 2 is a more detailed illustration of the TCM 130 of the preferred embodiment of the present invention. The TCM 130 comprises a cache module 220, a data formatter 255, a retrieval buffer 260, a request buffer 250, an address module 210, a buffer module 240, and a controller module 290.

Figure 5:
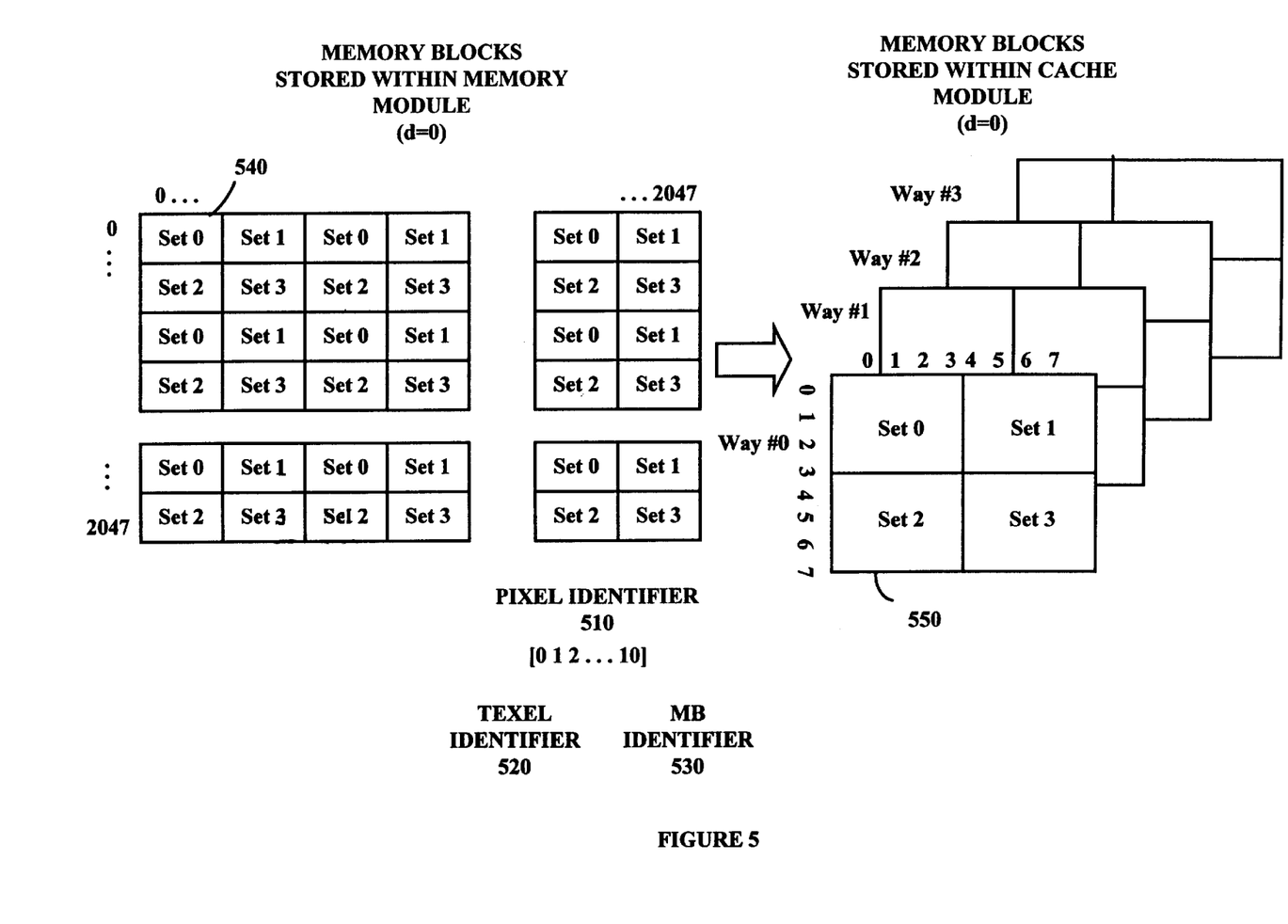
FIG. 5 is an illustration of the translation of the memory block storage scheme to the cache block storage scheme in the preferred embodiment.

The cache module 220, which in this embodiment is comprised of SRAM having a 4 way—4 set association, locally stores a subset of the memory blocks stored within the memory module 140. As is illustrated in FIG. 5, such an association results in the cache module 220 becoming organizationally divided into four ways (e.g., ways 0–3) with each way having four quadrants (sets). Each set having a unique cache block address (e.g., a number between 0 and 15) represents a 4×4 matrix of texels (cache block).

The address module 210, which is coupled to the scan module 160 and the cache module 220, receives from the scan module 160 a pixel identifier 510 ($u.u_f$, $v.v_f$, $d.d_f$), which includes an integer portion (u._, v._, d._) and a fractional portion (_.$u_f$, _.$v_f$, _.$d_f$), for each scanned pixel. From the integer portion of each pixel identifier 510, the address module 210 generates a memory block (MB) identifier and a texel identifier 520. The address module 210 utilizes the MB identifier 530 to identify a memory block within the memory module 140. The address module 210 utilizes the texel identifier 520 to locate a specific texel within that memory block. The address module 210 relies upon the fractional portion of the pixel identifier 510 as an interpolation factor for linearly interpolating the texels corresponding to the texel identifier 520 for pixel composition.

FIG. 5, in conjunction with FIG. 2, better illustrates the use of each of these identifiers in the preferred embodiment. For bi-linear filtering, the scan module 160 generates four, 11 bit [10:0] pixel identifiers 510 for every pixel of the three-dimensional graphic image. The address module 210 strips each integer portion of the pixel identifier 510 into a 9 bit MB identifier 530 and a 2 bit texel identifier 520. The MB identifier 530, which represents a 4×4 texel memory block within the memory module 140, is the highest 8 bits [10:2] of the integer portion. The texel identifier 520, which represents an orthogonal coordinate for a texel within this memory block, is the lower 2 bits [1:0] of the integer portion.

The address module 210 utilizes the MB identifier 530 to determine whether the memory block corresponding to the MB identifier 530 already has been locally stored within a cache block of the cache module 220. If the address module 210 determines that the memory block is already locally cached at a specific cache block address (hit), the address module 210 generates and transmits a transmit tag signal to the buffer module 240. The transmit tag signal includes the cache block address, the texel identifier 520, the interpolation factors and a hit marker. The TCM 130 relies upon the hit marker to identify transmit tag signals corresponding to memory blocks, which are already locally cached within the cache module 220.

If the memory block is not already locally cached (miss), the address module 210 initiates a request for retrieval of the memory block from the memory module 140 by transmitting a retrieval signal to the request buffer 250, which operates as a FIFO queue. In this embodiment, the request buffer 250 can receive up to 4 retrieval signals at the same time. The retrieval signal includes the MB identifier 530 and a linear memory module address. Since the retrieval signal cannot be transmitted to the memory module 140 any faster than the AGP/PCI interface (not shown) will allow, the request buffer 250 continuously transmits the retrieval signals to the memory module 140 in the order the corresponding pixel identifiers 510 were received by the address module 210. The AGP/PCI interface, however, limits the transmission rate of the request buffer 250 to an approximate maximum rate of 512 MBps.

The memory module 140 responds to the receipt of the retrieval signals by transmitting the memory block, which corresponds to the MB identifier 530, back to the TCM 130. However, due to cost constraints, which limit the storage capacity of the cache module 220 to a finite size, not all memory blocks retrieved from the memory module 140 can be immediately stored within the cache module 220. Instead, until the cache block associated with the memory block is available to store the memory block, the retrieval buffer 260, which also operates as a FIFO queue, temporarily stores the received memory blocks in the order received. In this embodiment, the retrieval buffer 260 receives the 256-bit memory block within 2 clock cycles of a system clock.

In addition to transmitting the retrieval signal to the request buffer 250, the address module 210 also generates and transmits a retrieval tag signal and a transmit tag signal to the buffer module 240. The retrieval tag signal includes a tag reference counter value, which will be discussed with regard to FIG. 3, and a cache block address, which designates a specific cache block within the cache module 220 where the retrieved memory block corresponding to the MB identifier 530 will be stored. The address module 210 determines the specific cache block address for each retrieval tag signal by relying upon a least recently used (LRU) algorithm. The transmit tag signal includes the cache block address, the texel identifer, interpolation factors and a miss marker.

The controller module 290 relies upon the retrieval tag signals in the buffer module 240 to control the transmission of the memory blocks from the retrieval buffer 260 to the cache block associated with the memory block. As will be discussed in more detail with regard to FIG. 4, when the controller module 290 determines that the cache block is available for the associated memory block at the top of the retrieval buffer 260, the controller module 290 triggers the transmission of the memory block to the data formatter 255. The data formatter 255 transforms this memory block from its original format into a cache module format, which in this embodiment is a conventional ARGB format. The data formatter 255 then transmits each of these reformatted memory blocks to the cache module 220 where the memory blocks are stored in their associated cache blocks.

The controller module 290 relies upon the interpolation information isolated by the address module 210 to determine when to trigger the transmission to the TFM 180 of each texel associated with each transmit tag signal from the cache module 220. Since a filtering technique, such as bi-linear filtering, requires more than one texel to perform pixel composition and there is the possibility that each of these texels may be located in a different cache block due to the 4 way—4 set organization of the cache module 220, up to four transmit tag signals must be transmitted to the cache module 220 for every composition of a pixel.

Figure 3:
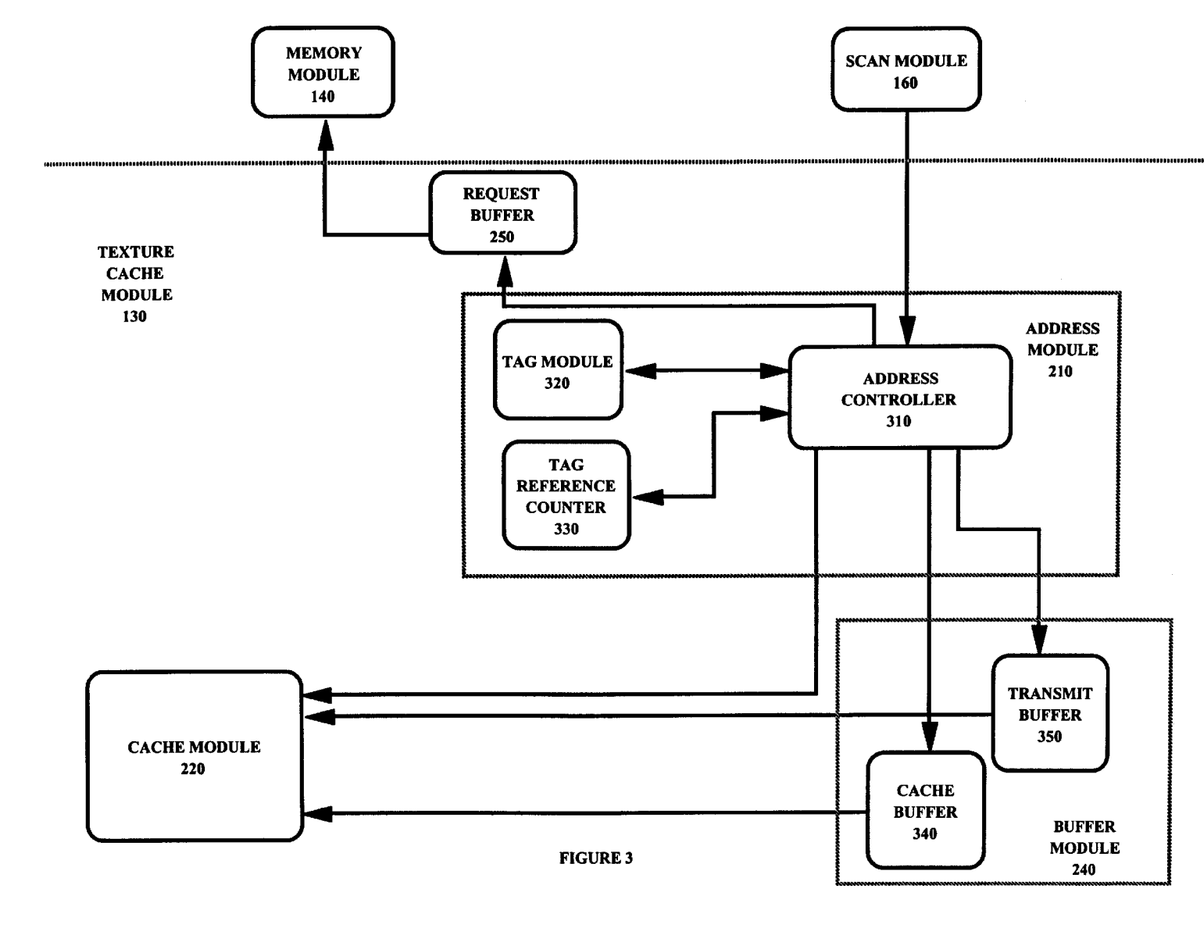
FIG. 3 is a detailed illustration of the address module of the preferred embodiment.

FIG. 3 is a more detailed illustration of the address module 210 and the buffer module 240. The address module 210 includes an address controller 310, a tag module 320, and a tag reference counter (TRC) 330. The buffer module 240 comprises a cache buffer 340 and a transmit buffer 350. Each buffer 340 and 350 can receive up to 4 tag signals at the same time. The tag module, which is coupled to the address controller 310, stores associations between each cache block address and the MB identifier 530 corresponding to the memory block stored within that cache block. In this embodiment, the tag module 320 is a table, which is edited by the address controller 310.

The address controller 310 is coupled to the request buffer 250, the tag module 320, the TRC 330, the cache buffer 340, the transmit buffer 350 and the scan module 160. In this preferred embodiment, the address controller 310 is a state machine, which either is a software program executed by a central processing unit (CPU) (not shown) of an Intel-based personal computer, or alternatively is comprised of hardware organized to implement a state machine. Upon receipt of the pixel identifiers 510 from the scan module 160, the address controller 310 compares the MB identifier 530 portion of each pixel identifier 510 with the MB identifiers 530 stored within the tag module 320. The TRC 330 records the consecutive number of times the address controller 310 achieves a match (hit) between these two MB identifiers 530. In this embodiment, the TRC 330 is an 8-bit counter, which initially is set to 0.

If the address controller 310 matches a received MB identifier 530 with an MB identifier 530 stored within the tag module 320, the address controller 310 generates the before-mentioned transmit tag signal containing the hit marker, the texel identifier 520, corresponding to the MB identifier 530, and the cache block address, associated with the MB identifier 530. The address controller 310 also increments the TRC 330 by a value of 1.

If the address controller 310 is unable to match a received MB identifier 530 with one of the MB identifiers 530 stored within the tag module 320, the address controller 310 generates a retrieval tag signal, which includes the MB identifier 530 and a linear memory module address. In addition, a transmit tag signal and a retrieval tag signal are generated and transmitted to the buffer module 240. The retrieval tag signal includes the current TRC value and a cache block address, which, as previously discussed, is associated by the address controller 310 with the unmatched MB identifier 530 through the use of the LRU algorithm. This cache block address later is used as the location within the cache module 220 where the retrieved memory block corresponding to the unmatched MB identifier 530 will be stored. Unlike the 'hit' situation, in the 'miss' situation the TRC 330 is not incremented by 1. Rather, the current value of the TRC 330 is incorporated into the retrieval tag signal and the TRC 330 is set back to 1. This TRC value represents the number of consecutive 'hits' before the address controller 310 identified the 'miss' situation. The transmit tag signal for the 'miss' situation includes the texel identifier 520, the cache block address corresponding to the texel identifier 520, and a 'miss' marker. The 'miss' marker is used to identify those transmit tag signals, which correspond to memory blocks that must be retrieved from the memory module 140. Both the retrieval tag signal and the transmit tag signal then are appended to the end of the cache buffer 340 and the transmit buffer 350, respectively.

Figure 4:
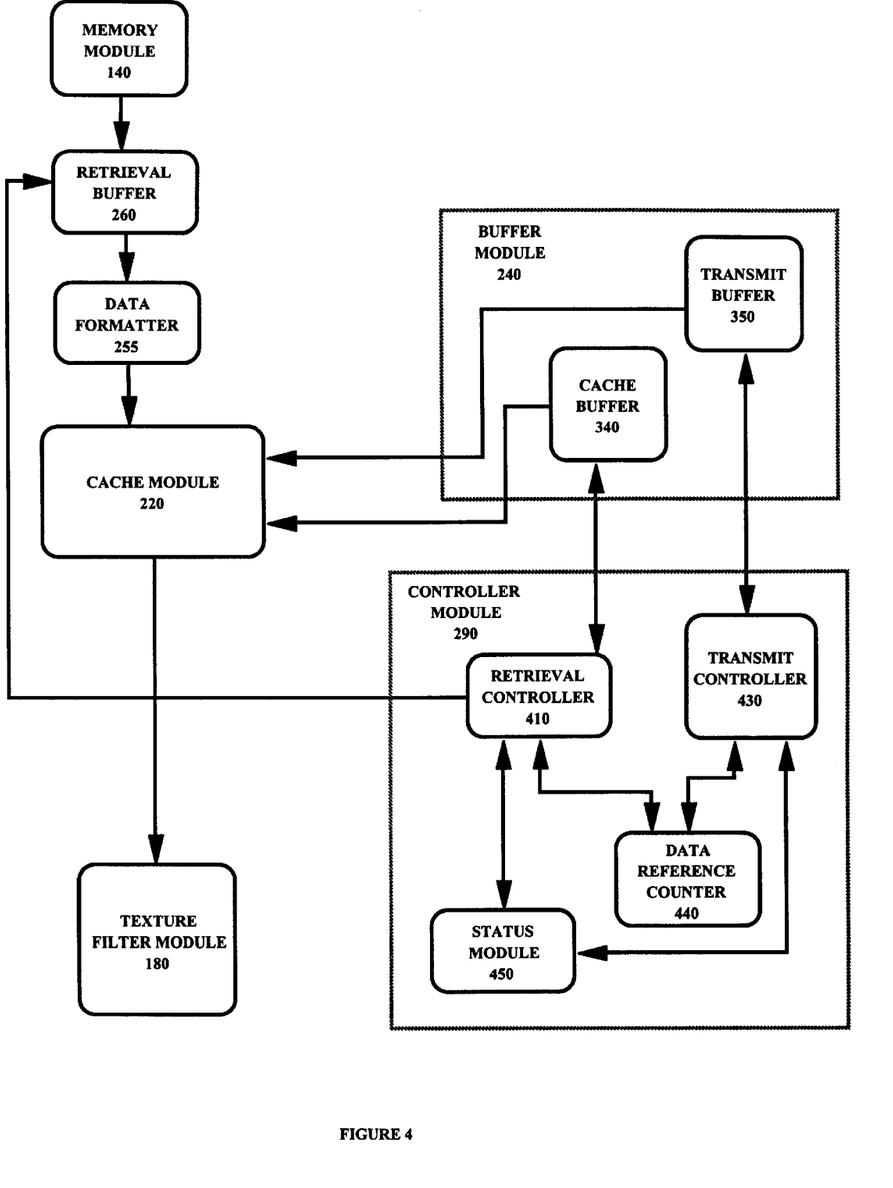
FIG. 4 is an illustration of the controller module of the preferred embodiment.

FIG. 4 illustrates a detailed view of the controller module 290 of the TCM 130. The controller module 290 includes a retrieval controller 410, a transmit controller 430, a data reference counter (DRC) 440 and a status module 450. The DRC 440 records the number of consecutive transmit tag signals having a 'hit' marker, which are transmitted to the cache module 220. In this embodiment, the DRC 440 is an 8-bit counter and the status module 450 is a table where each cache block address is associated with a logic state (e.g., "read only" logic state or "write only" logic state).

The transmit controller 430, which is coupled to the transmit buffer 350, the DRC 440 and the status module 450, controls when the texels within a memory block, which correspond to the transmit tag signals at the top of the transmit buffer 350, are further processed by the TCM 130. In the preferred embodiment, the transmit controller 430 is a state machine, which is either a software program executed by a CPU of an Intel-based personal computer, or alternatively comprises hardware components organized to implement such a state machine. If the transmit tag signals relating to a specific pixel both contain a 'hit' marker and are the next signals to be transmitted by the transmit buffer 350 as well as the logic state in the status module 450 of the corresponding cache blocks is set to the 'read only' state, the transmit controller 430 triggers the transmit buffer 350 to transmit the transmit tag signals to the cache module 220. The cache module 220 then transmits the texels corresponding to the transmit tag signals to the TFM 180. At approximately the same time, the transmit controller 430 also increments by one the DRC 440, which is initially set to a value of 0. If at least one of the transmit tag signals, which is at the top of the transmit buffer 350 and is associated with a specific pixel identifier 510, contains a 'miss' marker, the transmit controller 430 does not immediately trigger the transmit buffer 350 to transmit the transmit tag signals to the cache module 220. Rather, the retrieval controller 410 will change the logic states of the cache blocks from the 'read only' to the 'write only' state and will trigger the retrieval of the memory block from the retrieval buffer 260. Upon detecting the change of the logic state to 'write only', the transmit controller 430 changes the logic state back to the 'read only' state, increments the DRC by 1 and triggers the transmit buffer 350 to transmit the transmit tag signals, which are needed for pixel composition, to the cache module 220.

The retrieval controller 410 is coupled to the retrieval buffer 260, the cache buffer 340, the DRC 440 and the status module 450. In the preferred embodiment, the retrieval controller 410 is a state machine, which is a software program executed by a CPU of an Intel-based personal computer, or alternatively comprises hardware organized to implement such a state machine. The retrieval controller 410 is responsible for synchronizing the writing of memory blocks within the cache block 220 by changing the logic state associated with a specific cache block within the status module 450 from 'read only' to 'write only'. In particular, the retrieval controller 410 waits for the memory block corresponding to the retrieval tag signal to be received by the retrieval buffer 260 from the memory module 140. Once received, the retrieval controller 410 compares the current DRC value with the TRC value within the retrieval tag signal. When this TRC value is greater than 0 and less than the DRC value, the retrieval controller 410 pauses. When the DRC value is greater than or equal to the TRC value and the retrieval buffer 260 is not empty, the retrieval controller 410 sets the logic state corresponding to the cache block address to 'write only' and sets the DRC value back to 0.

As discussed above, the changing of the logic state to 'write only' will result in the retrieval controller 410 triggering the cache buffer 340 to transmit the retrieved memory block at the top of the retrieval buffer 260 to the data formatter 255 for reformatting. The data formatter 255 then transmits the reformatted memory block to the cache module 220 where the memory block is stored in the cache block corresponding to the retrieval tag signal. Once the memory block is stored within the cache module 220, the transmit controller 430 responds to the change in the logic state to 'write only' by changing the logic state of the cache block back to 'read only'. Even though this entire technique may have the risk of possibly overwriting memory blocks containing texels, which may be needed at a later time, the amount of latency avoided by this technique far outweighs the slight delay that is attributable to having to re-retrieve these memory blocks.

The foregoing description of the preferred embodiment has been presented for purposes of illustration and description. It is not intended to be exhaustive nor to limit the invention to the precise form disclosed. Many modifications and variations are possible in light of the above teaching. For example, tri-linear filtering, rather than bi-linear filtering can be supported by an alternative embodiment of the present invention. The preferred embodiment was chosen and described to best explain the principles of the invention and its practical application to thereby enable others skilled in the art to best utilize the invention in various embodiments and with various modifications as are suited to the particular use contemplated. The system and method, however, can be used in any other situation where a bandwidth bottleneck hinders the efficient processing of large amounts of data. It is intended that the scope of the invention be defined by the claims and their equivalents.

What is claimed is:

1. A non-stalled cache system, coupled to a memory module adapted to store a plurality of memory blocks, the system comprising:

a cache module, coupled to the memory module, adapted to store a first memory block of the plurality of memory blocks;

an address module adapted to receive a first pixel identifier of a plurality of pixel identifiers and adapted to determine whether the first pixel identifier corresponds to the first memory block stored within the cache module; and a controller module, coupled to the cache module and the address module, adapted to respond to the first pixel identifier corresponding to the first memory block by synchronizing the non-stalled transmission from the cache module of a first texel within the first memory block and the non-stalled storage of a second memory block of the plurality of memory blocks from the memory module in the cache module; said first texel corresponding to the first pixel identifier.

2. The system of claim 1 wherein the address module further comprises:

an address controller, coupled to the memory module and the controller module, adapted to respond to the first pixel identifier corresponding to the first memory block stored within the cache module by transmitting a first transmit tag signal to the controller module; said address module adapted to respond to the first pixel identifier not corresponding to the first memory block stored within the cache module by transmitting a retrieval signal to the memory module and a retrieval tag signal and a second transmit tag signal to the controller module; said retrieval signal triggering the transmission of a second memory block of the plurality of memory blocks from the memory module; said first transmit tag signal corresponding to the first texel within the first memory block within the cache module; said second transmit tag signal corresponding to a second texel within the second memory block that is to be stored within the cache module; said retrieval tag signal corresponding to the second memory block to be stored within the cache module.

3. The system of claim 2 wherein the controller module further comprises:

a retrieval controller, coupled to the address controller, adapted to respond to receipt of the retrieval tag signal from the address controller by synchronizing the non-stalled transfer of the second memory block from the memory module into the cache module to ensure that one of the plurality of memory blocks already within the cache module is not prematurely overwritten.

4. The system of claim 2 wherein the controller module further comprises:

a data reference counter adapted to increment a value by one when the controller module triggers the transmission of the first texel from the cache module; said value representing a number of consecutive texels corresponding to the first transmit tag signal that are triggered to be transmitted from the cache module.

5. The system of claim 2 wherein the controller module further comprises:

a transmit controller, coupled to the address controller and the cache module, adapted to respond to the receipt of the first transmit tag signal from the address controller by triggering the transmission of the first texel from the cache module and adapted to respond to receipt of the second transmit tag signal from the address controller by triggering the transmission of the second texel from the cache module.

6. The system of claim 1 wherein the address module further comprises:

a tag module adapted to store an association between the first pixel identifier and a cache block address; said cache block address representing the location of the first memory block within the cache module.

7. The system of claim 1 wherein the address module further comprises:

a tag reference counter adapted to increment a value by one when the first pixel identifier corresponds to the first memory block within the cache module; said value representing a number of consecutively received pixel identifiers of the plurality of pixel identifiers corresponding to one of the plurality of memory blocks stored within the cache module.

8. The system of claim 1 wherein the controller module further comprises:

a status module adapted to store a logic state for the cache module; said logic state corresponding to a read logic state or a write logic state.

9. The system of claim 1 further comprising:

a data formatter, coupled to the memory module and the cache module, adapted to receive data in a first format from the memory module and to transmit the data in a second format to the cache module.

10. A non-stalled cache system, coupled to a cache module and a memory module, the system comprising:

a data reference counter adapted to respond to the triggering of transmission of a first texel of a first memory block from the cache module by incrementing a first value by one; said first memory block is one of a first plurality of memory blocks stored within the cache module; said first value representing a number of consecutive texels from at least one of the first plurality of memory blocks within the cache module that are triggered to be transmitted from the cache module; and a retrieval controller, coupled to the data reference counter, adapted to respond to the first value having a value at least equal to a second value by triggering the storing of a second memory block of a second plurality of memory blocks from the memory module in the cache module; said second value representing a number of consecutive texels corresponding to a first transmit tag signal.

11. The system of claim 10 further comprising:

a transmit controller, coupled to the retrieval controller and the cache module, adapted to respond to the receipt of a first transmit tag signal by triggering the transmission of the first texel from the cache module and adapted to respond to receipt of a second transmit tag signal by triggering the transmission of a second texel of the second memory block from the cache module.

12. A method for non-stalled caching of at least one of a plurality of memory blocks from a memory module, the method comprising the steps of:

storing a first memory block of the plurality of memory blocks in a cache module;

determining whether a first pixel identifier of a plurality of pixel identifiers corresponds to the first memory block within the cache module; and responding to the first pixel identifier corresponding to the first memory block by synchronizing the non-stalled transmission from the cache module of a first texel within the first memory block from the cache module and the non-stalled storage of a second memory block of the plurality of memory blocks from the memory module in the cache module.

13. The method of claim 12 wherein the determining step comprises the additional steps of:

responding to the first pixel identifier corresponding to the first memory block stored within the cache module by transmitting a first transmit tag signal to a controller module; and responding to the first pixel identifier not corresponding to the first memory block within the cache module by transmitting a retrieval signal to the memory module and a retrieval tag signal and a second transmit tag signal to the controller module; said retrieval signal triggering the transmission of a second memory block of the plurality of memory blocks from the memory module; said first transmit tag signal corresponding to the first texel within the first memory block within the cache module; said second transmit tag signal corresponding to a second texel within the second memory block that is to be stored within the cache module; said retrieval tag signal corresponding to the second memory block to be stored within the cache module.

14. The method of claim 13 wherein the step of responding to the first pixel identifier corresponding to the first memory block comprises the additional step of:

responding to receipt of the retrieval tag signal by synchronizing the non-stalled transfer of the second memory block from the memory module into the cache module to ensure that a memory block within the cache module is not prematurely overwritten.

15. The method of claim 13 wherein the step of responding to the first pixel identifier corresponding to the first memory block comprises the additional step of:

incrementing a value by one when a controller module triggers the transmission of the first texel from the cache module; said value representing a number of consecutive texels corresponding to the first transmit tag signal that are triggered to be transmitted from the cache module.

16. The method of claim 12 wherein the determining step comprises the additional step of:

storing an association between the first pixel identifier and a cache block address; said cache block address representing the location of the first memory block within the cache module.

17. The method of claim 12 wherein the determining step comprises the additional step of:

generating a value representing a number of consecutively received pixel identifiers of the plurality of pixel identifiers corresponding to one of the plurality of memory blocks within the cache module.

18. The method of claim 12 wherein the step of responding to the first pixel identifier corresponding to the first memory block comprises the additional step of:

storing a logic state for the cache module; said logic state corresponding to a read logic state or a write logic state.

19. The method of claim 12 wherein the step of responding to the first pixel identifier corresponding to the first memory block comprises the additional step of:

responding to the triggering of transmission of the first texel of the first memory block from the cache module by incrementing a first value by one; said first memory block is one of the plurality of memory blocks stored within the cache module; said first value representing the number of consecutive texels from at least one of the plurality of memory blocks within the cache module that have been triggered to be transmitted from the cache module.

20. The method of claim 12 wherein the step of responding to the first pixel identifier corresponding to the first memory block further comprises the additional step of:

responding to a first value having a value at least equal to a second value by triggering the storing of the second memory block of the plurality of memory blocks from the memory module in the cache module; said first value representing a number of consecutive texels corresponding to the first transmit tag signal that are to be transmitted from the cache module; said second value representing a number of consecutively received pixel identifiers of the plurality of pixel identifiers corresponding to one of the plurality of memory blocks within the cache module.

* * * * *